US012573388B2

(12) United States Patent
Newell

(10) Patent No.: US 12,573,388 B2
(45) Date of Patent: Mar. 10, 2026

(54) BEHAVIOR DETECTION

(71) Applicant: DISH Network L.L.C., Englewood, CO (US)

(72) Inventor: Nicholas Brandon Newell, Centennial, CO (US)

(73) Assignee: DISH Network L.L.C., Englewood, CO (US)

( * ) Notice: Subject to any disclaimer, the term of this patent is extended or adjusted under 35 U.S.C. 154(b) by 370 days.

(21) Appl. No.: 17/969,537

(22) Filed: Oct. 19, 2022

(65) Prior Publication Data

US 2023/0059634 A1 Feb. 23, 2023

Related U.S. Application Data

(63) Continuation of application No. 16/180,719, filed on Nov. 5, 2018, now Pat. No. 11,501,765.

(51) Int. Cl.
| | |
|---|---|
| *G10L 17/00* | (2013.01) |
| *G06N 20/00* | (2019.01) |
| *G10L 15/22* | (2006.01) |
| *G10L 15/30* | (2013.01) |
| *G10L 25/63* | (2013.01) |
| *G10L 25/90* | (2013.01) |

(52) U.S. Cl.
CPC .............. *G10L 15/22* (2013.01); *G06N 20/00* (2019.01); *G10L 15/30* (2013.01); *G10L 25/63* (2013.01); *G10L 25/90* (2013.01)

(58) Field of Classification Search
USPC .................... 704/1–275; 706/1–62, 900–903
See application file for complete search history.

(56) References Cited

U.S. PATENT DOCUMENTS

| | | | |
|---|---|---|---|
| 5,418,717 A | 5/1995 | Su et al. | |
| 6,275,806 B1 | 8/2001 | Pertrushin | |
| 6,567,778 B1 | 5/2003 | Chang et al. | |
| 6,718,232 B2 | 4/2004 | Fujita et al. | |
| 8,269,834 B2 * | 9/2012 | Albertson .............. | H04N 7/181 |
| | | | 706/14 |
| 8,358,786 B2 | 1/2013 | Arora | |
| 8,463,611 B2 | 6/2013 | Roy et al. | |
| 8,566,097 B2 | 10/2013 | Nakano et al. | |
| 8,665,863 B2 | 3/2014 | Silverman | |
| 8,849,738 B2 | 9/2014 | Zhang et al. | |
| 8,880,398 B1 | 11/2014 | Aleksic et al. | |
| 9,082,407 B1 | 7/2015 | Faaborg et al. | |
| 9,147,399 B1 * | 9/2015 | Hart ........................ | G10L 17/08 |
| 9,269,374 B1 | 2/2016 | Conway et al. | |

(Continued)

OTHER PUBLICATIONS

Day Rowland William II; Management and Control of Mobile Computing Device Using Local and Remote Software Agents; 2016 (Year: 2016).*

(Continued)

*Primary Examiner* — Marcellus J Augustin
(74) *Attorney, Agent, or Firm* — Perkins Coie LLP

(57) ABSTRACT

A system includes a microphone and a computing device including a processor and a memory. The memory stores instructions executable by the processor to identify a word sequence in audio input received from the microphone, to determine a behavior pattern from the word sequence, and to report the behavior pattern to a remote server at a specified time.

20 Claims, 7 Drawing Sheets

(56) References Cited

U.S. PATENT DOCUMENTS

| | | | |
|---|---|---|---|
| 9,476,729 | B2 | 10/2016 | Goldman-Shenhar et al. |
| 9,484,030 | B1 | 11/2016 | Meaney et al. |
| 9,514,747 | B1 | 12/2016 | Bisani et al. |
| 9,538,007 | B1 | 1/2017 | Mariappan et al. |
| 9,786,281 | B1 | 10/2017 | Adams et al. |
| 9,915,547 | B2 | 3/2018 | Yuan |
| 10,032,111 | B1 | 7/2018 | Bertram et al. |
| 10,276,190 | B2 | 4/2019 | Ashoori et al. |
| 10,278,634 | B2 | 5/2019 | Cogill et al. |
| 10,437,833 | B1 | 10/2019 | Nguyen |
| 10,701,067 | B1 | 6/2020 | Ziraknejad et al. |
| 10,817,787 | B1 | 10/2020 | Zhang |
| 11,055,624 | B1 | 7/2021 | Sapp et al. |
| 2003/0018467 | A1 | 1/2003 | Sekiguchi |
| 2003/0216919 | A1 | 11/2003 | Roushar |
| 2004/0230832 | A1 | 11/2004 | McCallam et al. |
| 2006/0242705 | A1 | 10/2006 | Sadhasivam et al. |
| 2011/0106527 | A1 | 5/2011 | Chiu |
| 2012/0249741 | A1 | 10/2012 | Maciocci et al. |
| 2014/0104059 | A1 | 4/2014 | Tran |
| 2014/0136187 | A1 | 5/2014 | Wolverton et al. |
| 2014/0195213 | A1 | 7/2014 | Kozloski et al. |
| 2014/0247151 | A1 | 9/2014 | Proud |
| 2014/0356822 | A1 | 12/2014 | Hoque et al. |
| 2015/0088515 | A1 | 3/2015 | Beaumont et al. |
| 2015/0345981 | A1 | 12/2015 | Goldman-Shenhar |
| 2016/0093285 | A1 | 3/2016 | Christian et al. |
| 2016/0118050 | A1 | 4/2016 | Arslan |
| 2016/0349850 | A1 | 12/2016 | Tsuda |
| 2017/0084295 | A1 | 3/2017 | Tsiartas et al. |
| 2017/0154314 | A1 | 6/2017 | Mones et al. |
| 2018/0101860 | A1 | 4/2018 | Fleming |
| 2018/0184244 | A1 | 6/2018 | Bestor et al. |
| 2018/0253297 | A1 | 9/2018 | Richardson et al. |
| 2018/0286429 | A1 | 10/2018 | Bostick et al. |
| 2018/0322798 | A1 | 11/2018 | Kalva et al. |
| 2018/0357247 | A1 | 12/2018 | Siminoff et al. |
| 2019/0052471 | A1* | 2/2019 | Panattoni ............. H04L 67/306 |
| 2019/0230170 | A1 | 7/2019 | Marlin et al. |
| 2019/0297035 | A1* | 9/2019 | Fox ........................ H04L 51/10 |
| 2020/0143802 | A1 | 5/2020 | Newell |

OTHER PUBLICATIONS

Xue, Ming-ming; Car Driver Voice Assistant; 2018 (Year: 2018).*

* cited by examiner

100

400

Time

Location data

Audio attributes

Audio data

Profile(s)

DNN
200

$B_{l1}, B_{l2}, ..., B_{lm}$

Individual
Profiles
410

New profile(s)
and/or updated profile(s)

BEHAVIOR DETECTION

CROSS-REFERENCE TO RELATED APPLICATION

This application is a continuation of U.S. patent application Ser. No. 16/180,719, filed on Nov. 5, 2018, entitled "BEHAVIOR DETECTION," incorporated herein by reference in its entirety.

BACKGROUND

Current technology allows for monitoring of public spaces to detect dangerous, inappropriate, and/or illegal behavior. For example, cameras and/or microphones can be deployed to monitor parks, public transportation terminals, playgrounds, retail establishments, etc. However, current monitoring systems suffer from certain constraints. For example, image and/or audio data can consume significant amounts of bandwidth when transmitted for review. Current systems may not discriminate between data that should and should not be reviewed or analyzed, thus not only consuming unnecessary network bandwidth for transmission, but also consuming unnecessary resources in a computer receiving such data.

DETAILED DESCRIPTION

Figure 1:
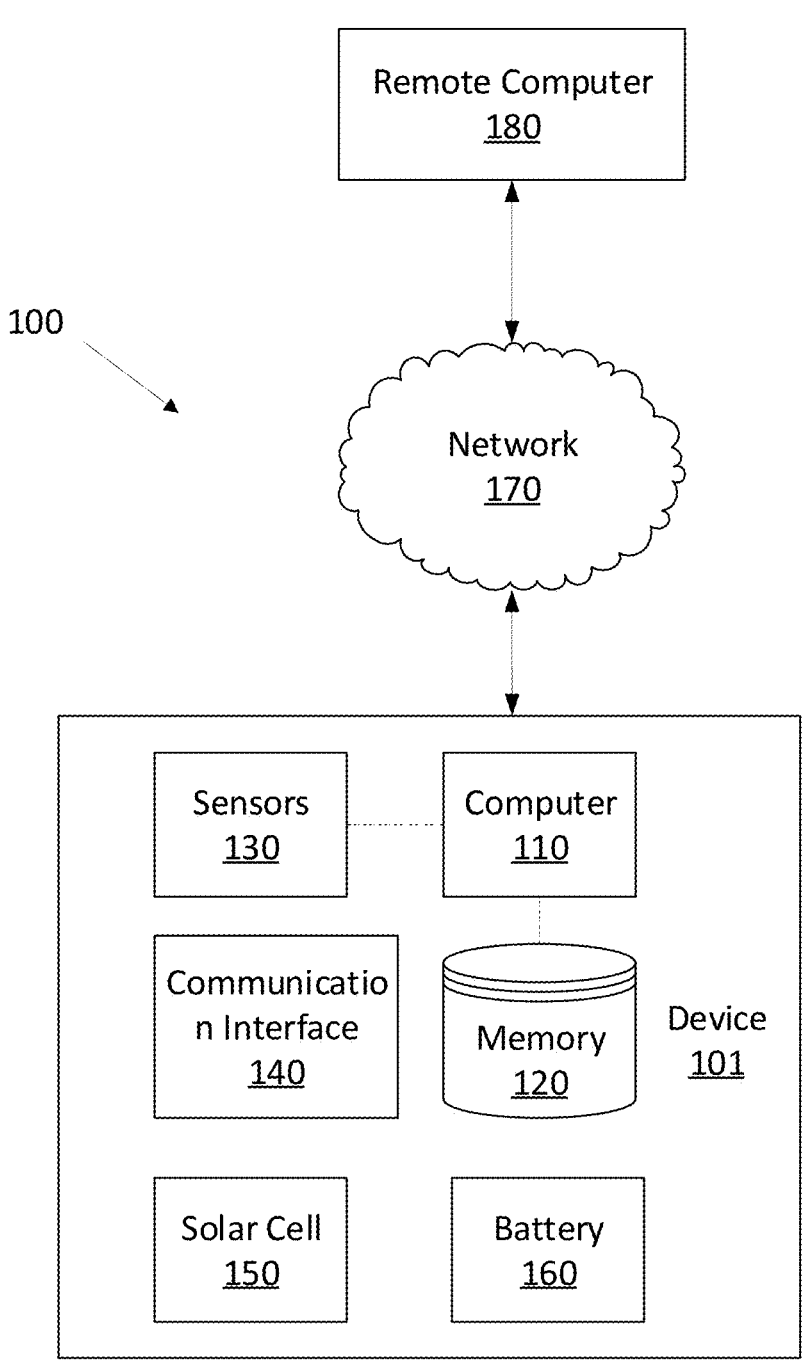
FIG. 1 illustrates an example system for detecting specified behavior and performing action(s) based on the detected behavior(s).

A system may include a microphone and a computing device including a processor and a memory. The memory may store instructions executable by the processor to identify a word sequence in audio input received from the microphone, to determine a behavior pattern from the word sequence, and to then take an action based thereon. The instructions can include instructions to report the behavior pattern to a remote server at a specified time. In some examples, based on the disclosed system and/or methods, a computer may be programmed to detect specified behavior pattern(s) in a convenience store, a playground in a park, etc. Thus, advantageously, the disclosed system may prevent unnecessary consumption of system bandwidth and/or make bandwidth consumption more efficient because a detection of a specified behavior pattern may be performed in the computer, e.g., at a location of the microphone, rather than transmitting audio data to a remote computer for further analysis and/or storage.

Disclosed herein is a system including a microphone, and a computing device including a processor and a memory. The memory stores instructions executable by the processor to identify a word sequence in audio input received from the microphone, to determine a behavior pattern from the word sequence, and to report the behavior pattern to a remote server.

The instructions may further include instructions to provide the audio input as input to a machine learning program, and to receive the behavior pattern as output from the machine learning program.

The instructions may further include instructions to provide at least one of a location, an identifier of an individual, or a time of day in the input to the machine learning program.

The instructions may further include instructions to receive an update to the machine learning program from the remote server.

The instructions may further include instructions to determine the behavior pattern from a volume, a pitch, a tone in the word sequence, or a location at which the audio input was received.

The instructions may further include instructions to identify the behavior pattern based on identifying an individual from the word sequence.

The instructions may further include instructions to identify the behavior pattern based on identifying two individuals from the word sequence.

The instructions may further include instructions to report the behavior pattern via a communication network to the remote server upon determining that a behavior threshold is exceeded.

The instructions may further include instructions to store an individual profile and identify an individual based on the received audio input and the stored profile, wherein the profile includes at least one of an identifier, vocabulary characteristic, syntax characteristic, voice attributes, and audio data including an individual's voice.

The instructions may further include instructions to determine the behavior pattern based at least in part on the individual profile.

Further disclosed herein is a method including identifying a word sequence in audio input received from a microphone, determining a behavior pattern from the word sequence, and reporting the behavior pattern to a remote server.

The method may further include providing the audio input as input to a machine learning program, and receiving the behavior pattern as output from the machine learning program.

The method may further include providing at least one of a location, an identifier of an individual, or a time of day in the input to the machine learning program.

The method may further include receiving an update to the machine learning program from the remote server.

The method may further include determining the behavior pattern from a volume, a pitch, a tone in the word sequence, or a location at which the audio input was received.

The method may further include identifying the behavior pattern based on identifying an individual from the word sequence.

The method may further include identifying the behavior pattern based on identifying two individuals from the word sequence.

The method may further include reporting the behavior pattern via a communication network to the remote server upon determining that a behavior threshold is exceeded.

The method may further include storing an individual profile and identify an individual based on the received audio input and the stored profile, wherein the profile includes at least one of an identifier, vocabulary characteristic, syntax characteristic, voice attributes, and audio data including an individual's voice.

The method may further include determining the behavior pattern based at least in part on the individual profile.

FIG. 1 shows an example system 100 including one or more device(s) 101 communicatively coupled to, i.e., connected via a wired and/or wireless communication network 170 with, a remote computer (or a server computer) 180.

The device 101 may include a housing, e.g., a plastic enclosure, and electronic components such as a computer 110, memory 120, sensor(s) 130, communication interface 140, an energy source such as a solar cell 150, and an energy storage such as a battery 160.

The computer 110 includes one or more processor(s). The memory 120 includes one or more forms of computer-readable media, and stores instructions executable by the computer 110 for performing various operations, including as disclosed herein.

The computer 110 may include programming to perform one or more of receiving data from the sensor(s) 130, transmit to and/or receive data from the remote computer 180, and/or to update data stored in the memory 120, etc.

The computer 110 may include or be communicatively coupled to via the communication interface 140, e.g., a wireless and/or wired communication transceiver. The computer 110 is generally arranged for communications on a communication network 170. In one example, a first device 101 may communicate with a second device 101 via their communication interfaces 140 and the network 170. In another example, the first and second devices 101 may communicate with one another via the remote computer 180 and the network 170.

The network 170 represents one or more mechanisms by which the computer 110 and the remote computer 180 may communicate with each other, and may be one or more of various wired or wireless communication mechanisms, including any desired combination of wired (e.g., cable and fiber) and/or wireless (e.g., cellular, wireless, satellite, microwave and radio frequency) communication mechanisms and any desired network topology (or topologies when multiple communication mechanisms are utilized). Exemplary communication networks include wireless communication networks (e.g., using one or more of cellular, Bluetooth, IEEE 802.11, etc.), local area networks (LAN) and/or wide area networks (WAN), including the Internet, providing data communication services.

The sensor(s) 130 include a microphone sensor 130 (or microphone) to receive audio data from an environment surrounding a device 101, e.g., a circular area centered at a device 101 location defined a radius, e.g., of substantially 10 meters. The computer 110 may receive audio data from the sensor 130 including sounds in the area, e.g., of human conversations, vehicular traffic, animals, etc. As discussed below, the computer 110 may be programmed to recognize the speech and/or sounds of human interactions using voice recognition techniques.

The device 101 may include a location sensor 130, and the computer 110 may be programmed to determine, e.g., location coordinates, of the device 101 based on data received from the location sensor 130. Additionally or alternatively, the computer 110 may be programmed to determine a location of the device 101 based on the data received via a short-range communication network, e.g., a WiFi router of a school, bar, etc., and/or a wide area network (WAN) such as a cellular, wireless, satellite, microwave and/or a radio frequency network 170. In yet another example, a device 101 memory 120 may store location data of the device 101.

The device 101 may be stationary (i.e., mounted in a manner so that a location of the device 101 does not change over time), e.g., at a park, a playground, a public transportation terminal, etc., and data describing the location of the device 101 (e.g., geo-coordinates that include conventional latitude, longitude pairs) may be stored in the device 101 memory 120.

The device 101 may include an energy source such as a solar cell 150, a plug or wiring connectable to an electric power source, etc., and/or an energy storage device such as a rechargeable battery 160. Thus, in one example, the device 101 can operate without relying on an external power supply. For example, the battery 160 may be charged by electric current received from the solar cell 150 when the device 101 is exposed to light. The device 101 may then operate based on stored energy at the battery 160, e.g., at night. Additionally or alternatively, the device 101 may include an electrical circuit to receive electrical power from an external power supply.

To reduce energy consumption of the device 101, especially when the device 101 is powered by a battery 160, the computer 110 may be programmed to cyclically test for receiving audio signals and then go to a "sleep state" (or a low power consumption mode). In the present context, the computer 110 may have an "active state", an "off state", and the "sleep state." An "active state" is a state in which the computer 110 performs operations such as receiving sensor 130 data, e.g., audio data, processing the received data, transmitting data via the communication interface 140, etc. In the "sleep state", the computer 110 may perform specified limited operations, e.g., a timer may operate that triggers an activation (or a wakeup) of the computer 110 processor each 101 milliseconds (ms), or an audio signal exceeding a specified amplitude may trigger the computer 110 to wakeup (i.e., go to the active state). As discussed with reference to FIG. 6A, upon receiving a wakeup trigger, the computer 110 may perform a specified set of steps, e.g., verifying based on microphone sensor 130 data whether a verbal human interaction is ongoing. Upon determining that no verbal human interaction is ongoing, the computer 110 processor may actuate the processor to go to the sleep state, e.g., to await a next wakeup trigger. In the present context, a verbal human interaction is a voice interaction between two or more individuals, e.g., a word sequence S in which at least a first portion, e.g., a phrase, of word sequence S is spoken by a first individual and a second portion of the word sequence S is spoken by a second individual.

Additionally or alternatively, a computer 110 circuit may be configured to wake up the computer 110 processor based on an amplitude (or volume) of an audio signal. For example, the microphone sensor 130, in addition to being connected to the processor, may be connected to an electrical circuit which is configured to generate a wakeup signal when an amplitude of a received electrical signal from the microphone sensor 130 exceeds a predetermined threshold, e.g., 10 dB.

With respect to FIG. 1, the computer 110 can be programmed to identify a word sequence in audio input received from the microphone sensor 130, to determine a behavior pattern B from the word sequence S, and to report the behavior pattern B to a remote computer 180 at a specified time. In the present context, a behavior pattern B is a set of audio data having values that match or exceed specified attribute values. A "behavior pattern" B, including attribute values that can be included in audio data to determine the behavior pattern B, is discussed below with respect to Tables 1 and 3.

The computer 110 may be programmed to receive the audio input from the device 101 microphone sensor(s) 130. The audio input, in the present context, includes an electrical audio signal received from the microphone sensor 130, e.g., at an analog-to-digital converter (ADC) circuit, and/or digital audio data received from a sensor 130 configured to provide digital audio data to the computer 110. The device 101 may further include an amplifier circuit to boost the audio signal amplitude prior to providing the audio signal to the ADC or the computer 110.

An "attribute" of audio data is any value that that describes a characteristic of the audio data, i.e., partly but not entirely describes the audio data. Audio data typically includes multiple attributes such as a sequence of one or more spoken words, a frequency, amplitude (or loudness), signal pattern (or a shape of a signal), etc., of sound. Based on the received audio data, the computer 110 may be programmed, using voice recognition techniques, to identify a word, amplitude, pitch, etc., in an individual voice. In other words, the computer 110 may be programmed to recognize words (in a given language) and a pitch, amplitude, etc. of the respective word. The computer 110 may be programmed to identify other data such as a rate of speech (e.g., a number of words spoken per second), intonation of the word, etc. Table 1 lists and explains example audio data attributes.

is determined by a different algorithm and/or a human operator. The computer 110 may be programmed to adjust the parameters a, b such that a deviation of the tone determined based on the equation (1) from the predetermined tone is less than a predetermined threshold, e.g., 10%. In another example, the computer 110 may be programmed to store a formula, table, etc., including rate of changes of pitch p and/or volume v, and to determine the tone t based on stored pitch thresholds and/or volume thresholds.

$$t = \Sigma_{i=1}^{n} a p_i + b v_i \qquad (1)$$

As discussed above, a behavior pattern B is specified by one or more attributes of audio data (typically including human speech). Equation (1) is an example of determining a tone of in human speech. In addition to a tone, volume, etc., a behavior pattern B may be determined based on a meaning of words or words sequences identified in the received audio data. For example, a behavior pattern may be identified based on identifying one of multiple specified words in the audio data.

$$B_l = c t + d \Sigma_{i=1}^{n} S_i \qquad (2)$$

For example, with reference to equation (2), the computer 110 may be programmed to determine a probability or likelihood $B_l$ of a behavior pattern B based on a word

TABLE 1

| Attribute | Description |
|---|---|
| Volume v | An average amplitude of an audio signal specified in, e.g., dB (decibel). |
| Pitch p | A rate of vibration (i.e., a frequency). A sound of voice changes as the rate of vibrations varies. As the number of vibrations per second increases, so does the pitch, meaning the voice would sound higher, while slower rates elicit deeper voices, or lower pitches. A human voice tends to change, sliding up and down the pitch scale, as different emotions, thoughts and/or feelings are expressed. Additionally, a pitch of an individual's voice is based on physiological properties, e.g., length and/or thickness of the individual's vocal folds. |
| Tone | A variation in spoken pitch. A tone can convey a range of other meanings in addition to the literal meaning of the respective word. |
| Word | A spoken word based on a specified language, e.g., English. |
| Word sequence | A series or sequence S of words, e.g., a sentence including subject, verb, adverb, etc. or a phrase of words, e.g., a greeting. |

The computer 110 may be programmed to determine a behavior pattern from a volume, a pitch, or a tone in a word sequence. A tone can convey a range of meanings in addition to a literal meaning of a spoken word, e.g., indicating an emotion, distinguishing between a statement and a question, focusing on an important element or elements of word sequence, etc. In one example, a tone of a word sequence may be specified with a value indicating a semantic index, i.e. an estimate of a degree to which the tone indicates a behavior pattern of concern, e.g., 1 (low severity) to 10 (high severity). A low severity behavior pattern is typically a pattern associated with behavior that is acceptable and/or that need not trigger action, whereas higher severities are associated with aggressive behavior patterns and/or patterns that should trigger an action. The computer 110 may be programmed to determine the tone based on rate of change of pitch and/or volume in the word sequence, etc.

For example, the computer 110 may be programmed to determine the tone t based on equation (1). The computer 110 may be programmed to determine the tone t for a word sequence including n words. Parameters a, b may be determined based on empirical methods. For example, the parameters a, b may be determined based on a set of word sequence that have been evaluated previously, e.g., the tone sequence S which has n words and combination of attributes from the word sequence S which has n words. Each word, e.g., an $i^{th}$ word, in a word sequence S may have a semantic index $S_i$. In one example, a semantic index is stored in a computer 110 memory. A semantic index $S_i$ is a number in a specified range, e.g., 0 (semantic index=0) to 10 (high semantic index). A semantic index $S_i$ for a set of words may be stored in a computer 110 memory. In the present context, the likelihood $B_l$ of the behavior pattern B, determined based on equation (2) may be a number within a specified range, e.g., 0 (the behavior pattern not likely) to 1 (the behavior pattern confidently detected). In one example, the parameters c, d may be set to 1. The parameters c, d may be determined based on empirical tests, as discussed above with respect to equation (1).

The computer 110 may be programmed to report the behavior pattern B via a local network 170 to the remote server 180 upon determining that a behavior threshold, e.g., 0.7, is exceeded. In other words, upon determining that the likelihood $B_l$ of the behavior pattern B exceeds a threshold, the computer 110 may determine that the behavior pattern B is detected and may perform an action such as sending a message to the remote server 180 including the behavior pattern B and/or a location of the occurrence of the behavior pattern B. Additionally or alternatively, upon determining that the behavior pattern B is detected, the computer 110 may be programmed to actuating an audio and/or a visual alarm, e.g., a siren.

As discussed above, a likelihood $B_l$ of a specified behavior pattern B may be determined based on the equation (1). In another example, the computer 110 may be programmed to determine different behavior pattern(s). For example, the computer 110 may be programmed to determine multiple different behavior patterns $B_1, B_2, \ldots, B_m$. In one example, with reference to equation (3), the computer 110 may be programmed to determine a likelihood $B_{l1}, B_{l2}, \ldots, B_{lm}$, of m different behavior patterns $B_1, B_2, \ldots, B_m$. In example equation (3), $B_{lj}$ represents a likelihood of behavior $B_j$, and $S_{ij}$ represents a semantic index of the $i^{th}$ word with respect to behavior $B_j$. In one example, a semantic index of a word may be specified to vary based on which behavior pattern is expected to be detected. Thus, a word $S_i$ of a sequence S may have a first semantic index $S_{ij}$ with respect to a behavior pattern $B_j$ and a second semantic index $S_{ik}$ with respect to a behavior pattern $B_k$. The computer 110 memory may store meaning severities $S_{ij}$ for a word with respect to different behavior patterns $B_1, B2, \ldots, B_m$.

$$B_{lj} = ct + d\Sigma_{i=1}^{n} S_{ij} (j = 1 \ldots m) \tag{3}$$

With respect to determining multiple behavior patterns $B_1, B_2, \ldots, B_m$, the computer 110 may be programmed to perform an action, e.g., sending a message to the remote computer 180, upon determining that at least one of likelihoods $B_{l1}, B_{l2}, B_{lm}$ exceed a threshold. In one example, the computer 110 may be programmed to store multiple thresholds $t_1, \ldots, t_m$, e.g., 0.5, 0.8, $\ldots$, 0.9, and to perform an action upon determining that a likelihood $B_{l1}, B_{l2}, \ldots, B_{lm}$ exceeds a threshold tn.

In another example, the computer 110 may be programmed to identify a behavior pattern B based on a set of rules such as shown in Table 2. The computer 110 may be programmed to determine that the behavior pattern B is detected upon determining that at least one of or a specified combination of rules are satisfied.

are sometimes referred to as artificial neurons 205, because they are designed to emulate biological, e.g., human, neurons. A neuron block 210 illustrates inputs to and processing in an example artificial neuron 205$i$. A set of inputs $x_1 \ldots x_r$ to each neuron 205 are each multiplied by respective weights $w_{i1} \ldots w_{ir}$, the weighted inputs then being summed in input function to provide, possibly adjusted by a bias $b_i$, net input which is then provided to activation function $f$, which in turn provides neuron 205$i$ output $y_i$. The activation function $f$ can be a variety of suitable functions, typically selected based on empirical analysis. As illustrated by the arrows in FIG. 3, neuron 205 outputs can then be provided for inclusion in a set of inputs to one or more neurons 205 in a next layer.

The DNN 200 can be trained to accept as input sensor 130 data, e.g., audio data, from the device 101 sensor(s) 130, and to output a likelihood $B_l$ of a behavior pattern B. For example, the audio data received from the microphone sensors 130 may be provided as input to a machine learning program, and the DNN 200 may output the behavior pattern B as output from the machine learning program. The DNN 200 can be trained with ground truth data, i.e., data about a real-world condition or state, possible examples of which are discussed below. Weights w can be initialized by using a Gaussian distribution, for example, and a bias b for each node 205 can be set to zero. Training the DNN 200 can including updating weights and biases via conventional techniques such as back-propagation with optimizations.

A set of weights w for a node 205 together are a weight vector for the node 205. Weight vectors for respective nodes 205 in a same layer of the DNN 200 can be combined to form a weight matrix for the layer. Bias values b for respective nodes 205 in a same layer of the DNN 200 can be combined to form a bias vector for the layer. The weight matrix for each layer and bias vector for each layer can then be used in the trained DNN 200.

Training may be an iterative operation. In one example, the computer 180 may be programmed to perform an iterative training until an error, i.e., a difference between an

TABLE 2

| Rule | Description |
| --- | --- |
| Tone exceeding threshold | A behavior pattern B is detected upon determining that a tone of one or more words exceed a predetermined threshold, e.g., 5 in a range of 0 (lowest severity) to 10 (highest severity). |
| Semantic index exceeding threshold | A behavior pattern B is detected upon determining that a semantic $S_i$ index of one or more words in a word sequence S exceeds a threshold. For example, a semantic index $S_i$ may exceed a threshold when a profanity word is recognized in the word sequence S. |

Figure 2:
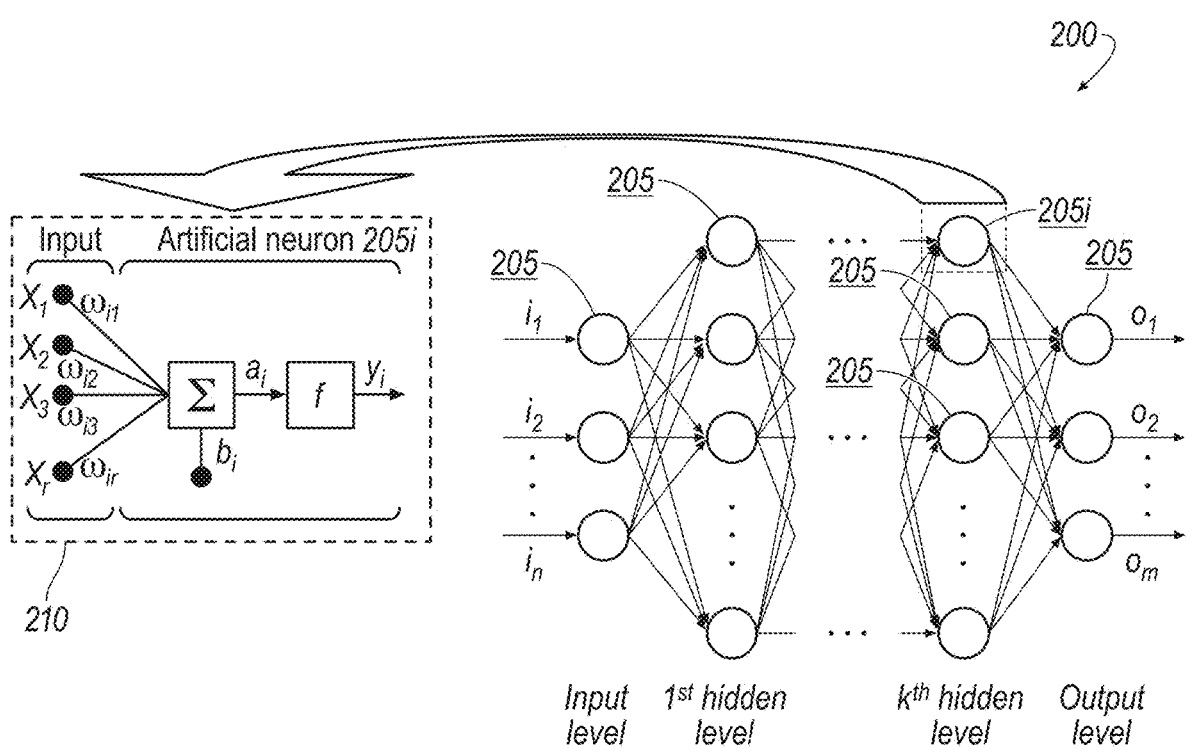
FIG. 2 illustrates an example Deep Neural Network (DNN).

In yet another example, the computer 110 may be programmed based on a neural network such as a Deep Neural Network (DNN) to determine a behavior pattern B in the received audio data. FIG. 2 is a diagram of an example deep neural network (DNN) 200. The DNN 200 can be a software program that can be loaded in memory and executed by a processor included in computer 110, for example. The DNN 200 can include n input nodes 205, each accepting a set of inputs i (i.e., each set of inputs i can include on or more inputs x). The DNN 200 can include m output nodes (where m and n may be, but typically are not, a same number) provide sets of outputs $o_1 \ldots o_m$. The DNN 200 includes a plurality of layers, including a number k of hidden layers, each layer including one or more nodes 205. The nodes 205 expected output (based on training data) relative to an output from the trained DNN 200, is less than a specified threshold, e.g., 10%.

Figure 3A:
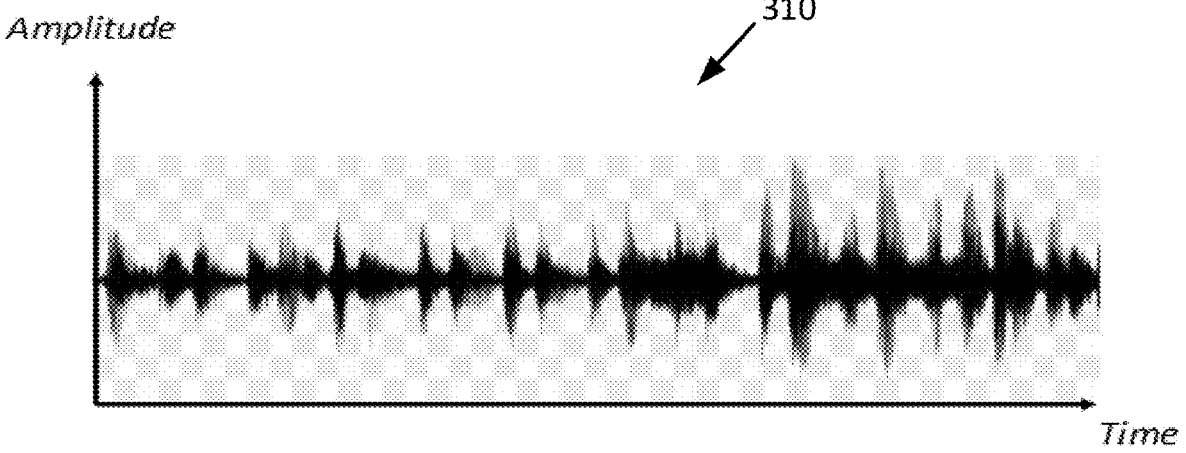
FIG. 3A illustrates an example audio signal.

In the present context, the ground truth data (or training data) used to train the DNN 200 typically includes audio data, time data, and/or location data, from a device 101 sensor 130 about a behavior pattern B, and labeling data. FIG. 3A is an example graph 310 illustrating example audio signal(s). For example, audio data can be gathered from a device 101 microphone sensor 130. The data can then be labeled for training the DNN 200, i.e., tags identifying conditions such as a likelihood $B_l$ of a behavior pattern B recognized (e.g., on a scale of 0 to 5 as discussed above).

Figure 3B:
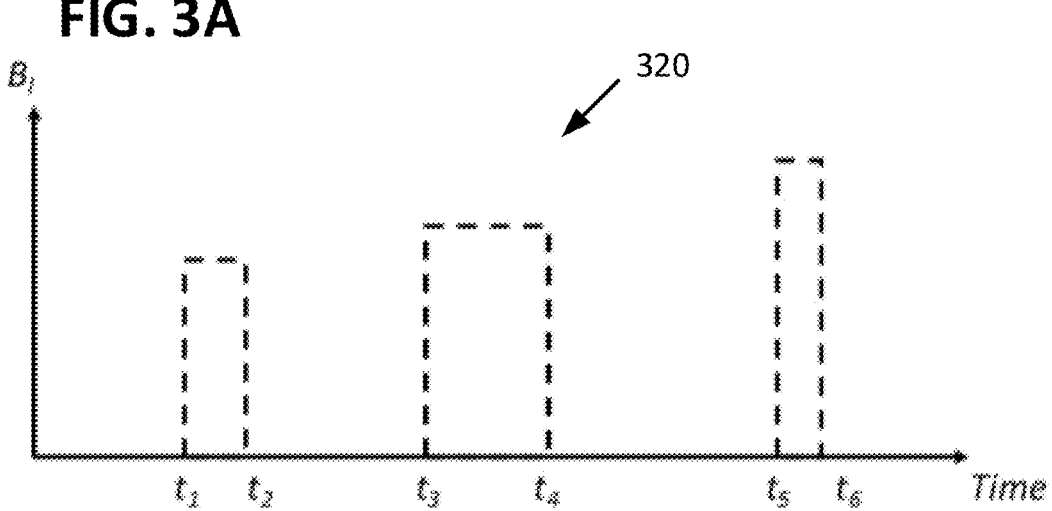
FIG. 3B illustrates tagging (or labeling) behavior patterns in the audio signal of FIG. 3A.

FIG. 3B is an example graph 320 showing example labeling (or meta data) included in the training data. For example, the graph 320 shows a likelihood $B_l$ of occurring the behavior pattern B in time intervals $t_1$ to $t_2$, $t_3$ to $t_4$, and $t_5$ to $t_6$. The graph 320 illustrates different likelihood(s) $B_l$ of the behavior pattern B. The data shows in the graph 320 may include as meta data in the training data and be synchronized to the audio data. In the present context, "synchronized to the audio data," means example time intervals $t_1$ to $t_2$, $t_3$ to $t_4$, and $t_5$ to $t_6$ are based on same time reference of audio data.

Additionally or alternatively, the training data may include labeling of multiple behavior patterns $B_1$, $B_2$, . . . , $B_m$. For example, each label included in the training data may include an identifier of the behavior $B_1$, $B_2$, . . . , $B_m$, and a likelihood $B_{l1}$, $B_{l2}$, . . . , $B_{lm}$ value, e.g., a value between 0 (zero) and 1.

Figure 4:
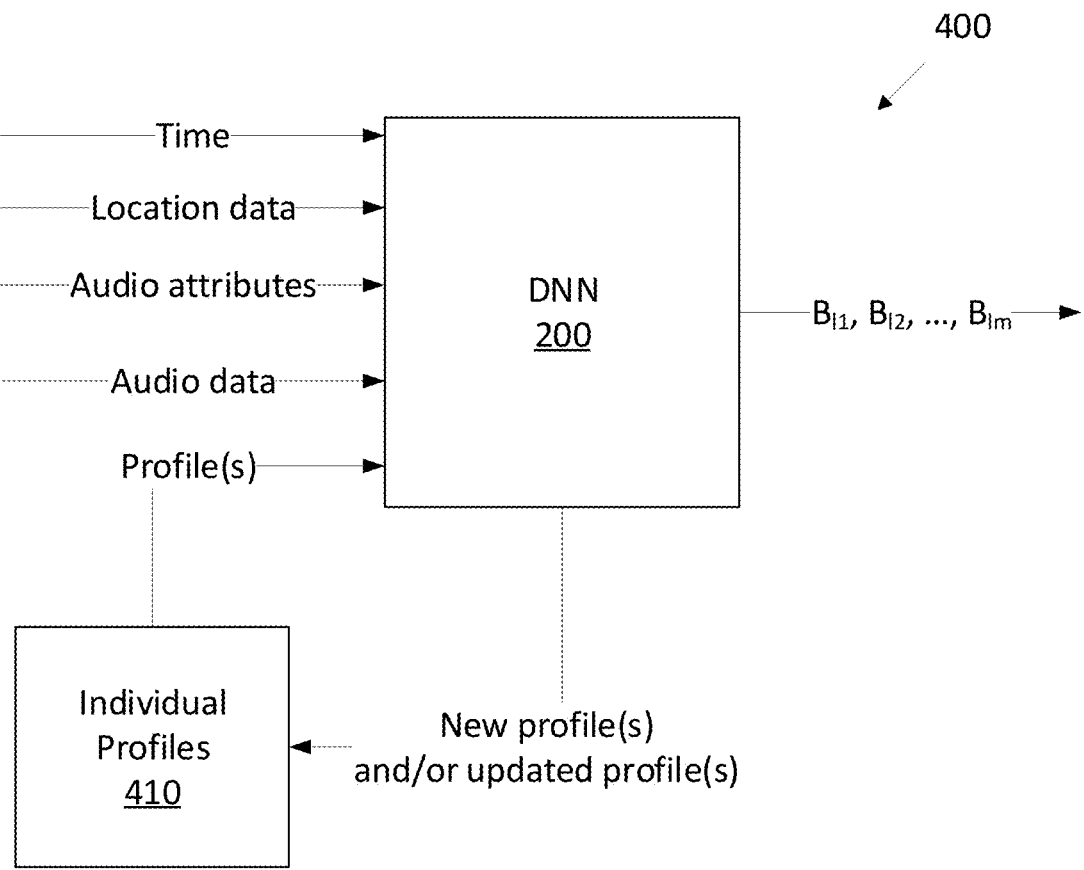
FIG. 4 illustrates an example block diagram of a DNN with profiles input.

The DNN 200 may be trained based on the training data, e.g., using back-propagation techniques with optimizations. Thus, the parameters (weights w and bias b) may be adjusted such that the DNN 200 can output the likelihood $B_{l1}$, $B_{l2}$, . . . , $B_{lm}$ based on inputs including the audio data, the attributes such as shown in Table 1, and/or other data such as a location of the device 101. With reference to FIG. 4, a DNN 200 may be trained, based on the example training data of FIGS. 3A-3B, to detect a behavior pattern $B_1$, $B_2$, . . . , $B_m$ based on audio data, audio attributes, location, and/or time. For example, the computer 110 can be programmed to determine the audio attributes, e.g., pitch P, word sequence(s) S, etc., of the training audio data and to train the DNN 200 further based on labeling of the audio data synchronized with the audio data, e.g., specific pitch P, word sequence S, etc. occurring during a time interval $t_1$-$t_2$, in which a specified likelihood $B_l$ of a behavior pattern B is specified (predetermined in labeling). Upon training the DNN 200, the computer 110 may be programmed to apply the trained DNN 200 on received data, including audio data, audio attributes, location, and/or time, to detect a behavior $B_1$, $B_2$, . . . , $B_m$.

A behavior pattern B can be (but is not always) associated with an individual voice, e.g., in a vocal interaction between multiple individuals. Additionally, the computer 110 may be programmed to identify the behavior pattern B based on identifying two or more voices in a word sequence S. Thus, as discussed below, the computer 110 may be programed to identify an individual with a behavior pattern B, i.e., which individual has shown a behavior pattern B (or has a likelihood $B_l$ of a behavior pattern B exceeding a threshold).

The computer 110 may be programmed to identify an individual based on voice attributes such as pitch, tone, volume, etc. The computer 110 may be programmed to store an individual profile (or individual audio fingerprint) and identify an individual based on the received audio data and the stored profile(s). Table 3 shows an example individual profile including an identifier (e.g., name of the individual), vocabulary characteristic, syntax characteristic, and/or voice attributes. Additionally or alternatively, a profile may specify a group of individuals, e.g., adult, elementary school child, etc. Alternatively, a behavior pattern B may be detected without relying on an individual profile and/or a group profile. Thus, a behavior pattern B may be detected based on the audio attributes and words included in the received audio data, and/or location, time, etc.

TABLE 3

| Datum | Description |
|---|---|
| Identifier | A substantially unique alphanumeric string. |
| Vocabulary characteristic | Specific words or word sequences based on which an individual may be identified. |
| Syntax characteristic | Specific grammatical errors and/or grammatical syntaxes based on which an individual may be identified. |
| Audio attributes | Pitch, volume, tone, etc. |
| Average likelihood of a behavior pattern | An average value of a behavior pattern determined over a sliding time window, e.g., a last hour of received audio data. In another example, this table may include multiple entries for average likelihood, e.g., one entry per each of multiple behavior patterns. |
| Audio clip | Recorded audio data including a voice of the respective individual. In one example, the audio data may be processed at the remote computer to determine an identifier. |

The computer 110 may be programmed to identify an individual based on a received word sequence(s) S. For example, the computer 110 may be programmed to identify an individual based on a response of the individual to hearing his or her name. The computer 110 may be programmed to identify the individual based on a combination audio attributes, e.g., pitch P, word sequence including response calling an identifier of the individual, etc.

The computer 110 may be programmed to store a profile, e.g., such as example shown in Table 3, for each individual in the device 101 memory 120. Additionally or alternatively, the computer 110 may be programmed to transmit profile's data via the network 170 to the remote computer 180. For example, the remote computer 180 may be programmed to store profiles data and/or update stored profile's data in a remote computer 180 memory based on data received from one or more devices 101. The remote computer 180 may be programmed to associate an identifier to the received profile data based on the received audio data of the individual stored as a part of the profile, e.g., based on a user input at a remote location.

The computer 110 may be programmed to receive (or download) the profile(s) from the remote computer 180 and to identify an individual based on received profile and/or to determine to use a generic profile. Thus, the computer 110 may download profile data for individuals with an existing profile on the remote computer 180. The computer 110 may be programmed to identify an individual based on the received audio data and the stored profiles. Additionally, the computer 110 may be programmed to add and store a new profile for an individual detected based on the audio data which does not match the existing profiles. In the present context, "not matched existing profiles" means that the computer 110 failed to identify the individual based on the stored profile data.

The remote computer 180 may be programmed to receive profile data for an individual from a first device 101 when the individual talks within a detection range, e.g., 20 meters, of the first device 101 and to store the profile data for the respective individual. Upon a change of the individual's location, e.g., the individual moving to an area within a detection range of a second device 101, the remote computer 180 may provide the stored profile to the second device 101 and the second device 101 computer 110 may identify the individual based on the received profile data.

An individual behavior may change over time. In other words, a gradual change of behavior of an individual toward a specified behavior pattern B may be an indicator or predictor of a behavior pattern B in the future. In some examples, the computer 110 may be programmed to perform actions, e.g., send a report, upon determining that a rate of change a likelihood $B_i$ exceeds a threshold (e.g., 0.1 over 5 hours of audio data including individual's audio data), although the likelihood $B_i$ may be still below the threshold. The computer 110 may be programmed to perform an action based on a rate of a change of a likelihood $B_i$ of a behavior pattern B. With reference to Table 3, the computer 110 may be programmed to update and store the average likelihood $B_i$ of the behavior pattern B in the behavior of a respective individual. The computer 110 may be programmed to transmit updated profile data to the remote computer 180.

In one example, upon determining that a rate of change of likelihood $B_i$ exceeded a threshold, the computer 110 may be programmed to perform an action, e.g., sending a notification to the remote computer 180 including an identifier of the individual, location of the device 101, the likelihood $B_i$ of the behavior pattern B.

As discussed above, the DNN 200 may be trained to determine one or more of a likelihood $B_{l1}, B_{l2}, \ldots, B_{lm}$ of a behavior pattern $B_1, B_2, \ldots, B_m$, based on the received training data. With reference to FIG. 4, in addition or as an alternative to the audio data, audio attributes, location, and/or time, the DNN 200 may be trained to determine one or more of a likelihood $B_{l1}, B_{l2}, \ldots, B_{lm}$ of a behavior pattern $B_1, B_2, \ldots, B_m$ further based on individual profiles 410. FIG. 4 shows an example diagram 400 including the DNN 200 and profiles 410. The DNN 200 may be trained to receive one or more profiles 410 of individuals. The DNN 200 may be trained to add new profiles (e.g., of individuals with no previously stored profile) and/or to update existing profiles 410 based on the received audio data. In one example, to train the DNN 200 to determine one or more of a likelihood $B_{l1}, B_{l2}, \ldots, B_{lm}$ of a behavior pattern $B_1, B_2, \ldots, B_m$ further based on the individual profiles, the training data may include individual profiles. For example, the training data may include example individual profiles and the DNN 200 may be trained to identify the individual voices in the training audio data based on the profiles 410 included in the training data.

The DNN 200 may be further trained to take a location and/or a time of the day as an input to the machine learning program. For example, the training data may include correlation of a behavior pattern $B_1, B_2, \ldots, B_m$ to certain time of day and/or location(s). Thus, the computer 110 may be programmed to determine a behavior pattern $B_1, B_2, \ldots, B_m$ based $B_1, B_2, \ldots, B_m$ on a location at which the audio input was received. For example, the computer 110 may be trained to take into account the location and/or time data in determining the likelihood $B_{l1}, B_{l2}, \ldots, B_{lm}$ of a behavior pattern $B_1, B_2, \ldots, B_m$.

The DNN 200 may be retrained, e.g., based on new training data. In one example, a remote computer 180 may be programmed to update a machine learning program or technique such as the DNN 200. In one example, the device 101 computer 110 may be programmed to receive an updated DNN 200 upon updating, e.g., retraining the DNN 200.

Figure 5:
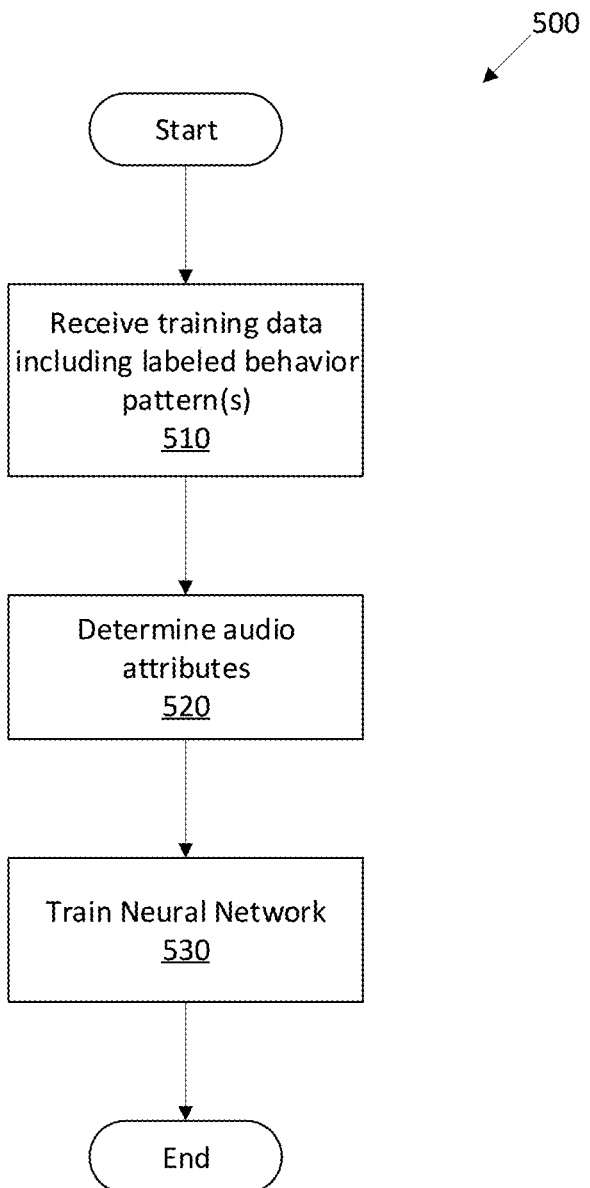
FIG. 5 illustrates an exemplary process for training a DNN based on labeled audio data.

FIG. 5 shows an example process 500 for training a DNN 200. In one example, a remote computer 180 may be programmed to execute blocks of the process 500.

The process 500 begins in a block 510, in which the computer 180 receives training data. The training data may include audio data and labels assign to the input data (e.g., see FIGS. 3A-3B). The labeling data may include a likelihood $B_{l1}, B_{l2}, \ldots, B_{lm}$ of a behavior pattern $B_1, B_2, \ldots, B_m$, time, location, etc.

Next, in a block 520, the computer 180 determines audio attributes of the audio data included in the training data. For example, the computer 180 may be programmed to determine attributes such as shown in Table 1.

Next, in a block 530, the computer 180 trains the neural network, e.g., the DNN 200. The computer 180 may be programmed to apply the training data to the DNN 200. In one example, the computer 180 may be programmed to perform an iterative routine until a difference between likelihood $B_l$ determined by the DNN 200 relative to a likelihood included in the training data is less than a specified threshold. In other words, the training of the DNN 200 may be continued until an error in an output of the DNN 200 relative to the training data is less than a threshold, e.g., 0.1.

Following the block 530, the process 500 ends, or alternatively returns to the block 510, although not shown in FIG. 5.

Figure 6A:
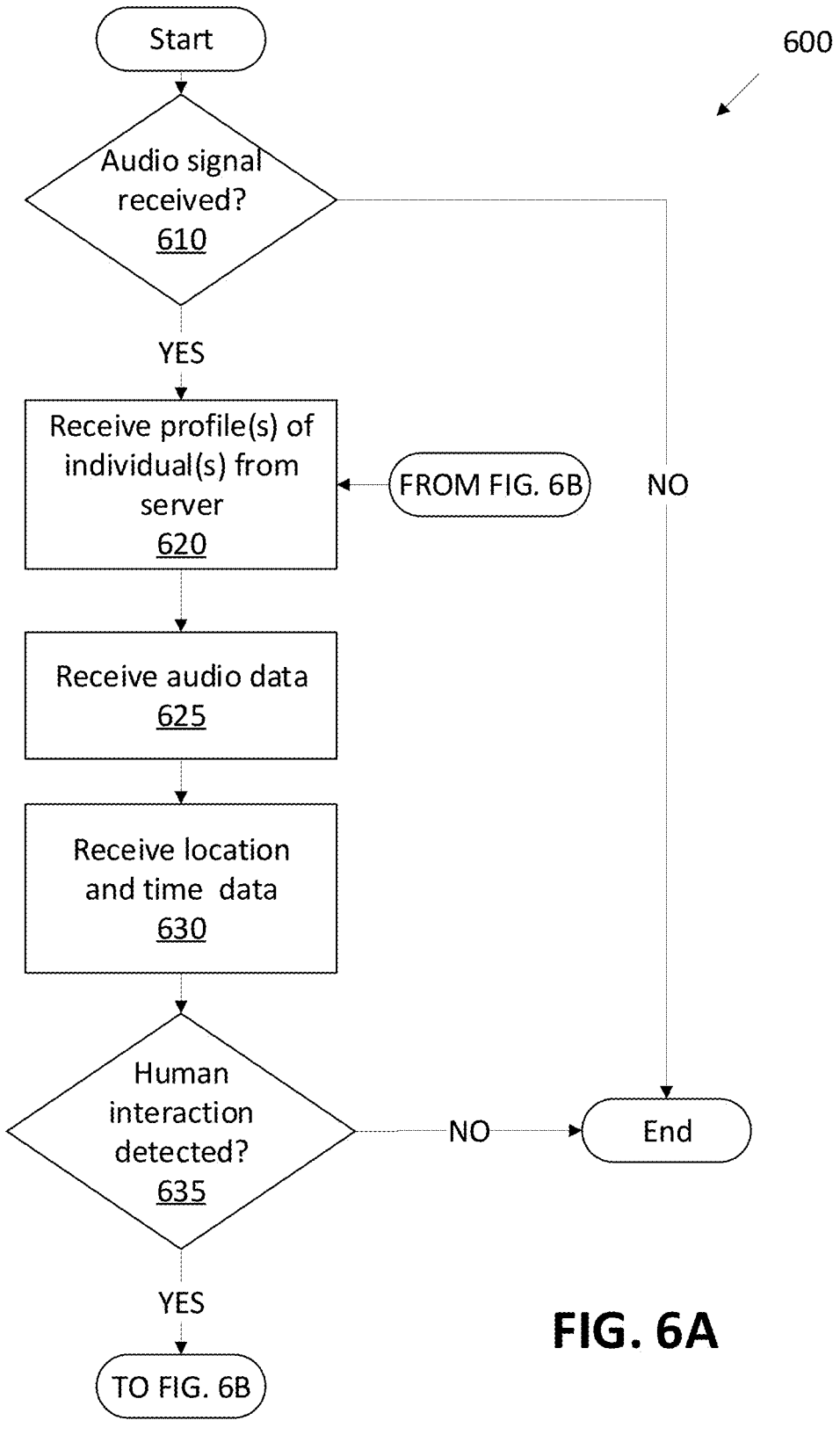
FIGS. 6A-6B illustrate an exemplary process for operating the device of FIG. 1.
Figure 6B:
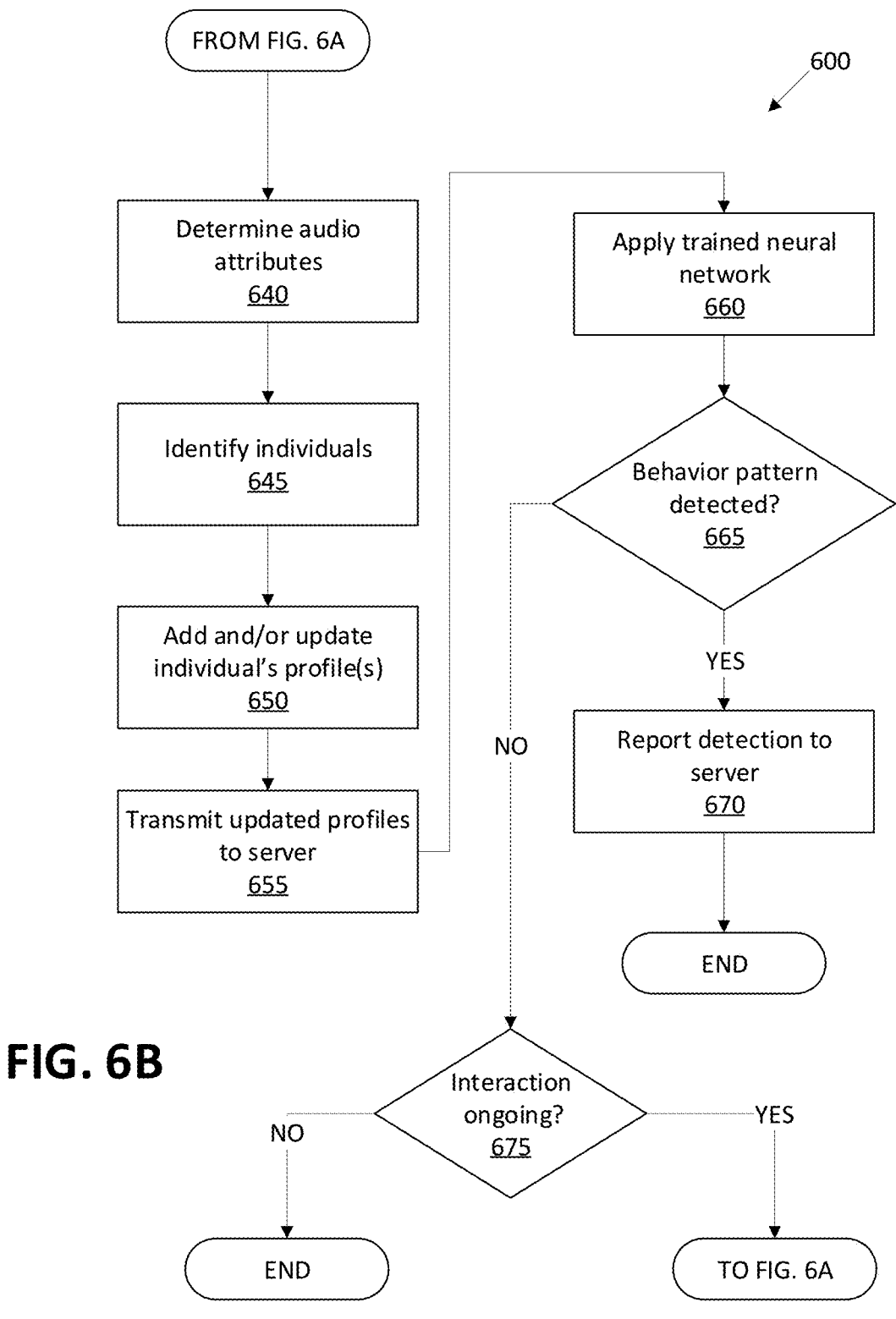

FIGS. 6A-6B show an example process 600 for operating a device 101. The device 101 computer 110 may be programmed to execute blocks of the process 600.

With reference to FIG. 6A, the process 600 begins in a decision block 610, in which the computer 110 determines whether an audio input is received. The computer 110 may be programmed to determine that an audio signal is received upon determining that an amplitude of the signal exceeds a threshold, e.g., 10 dB. Additionally or alternatively, the computer 110 may be programmed to determine that an audio signal is received upon recognizing a human voice in the received audio signal based on voice recognition techniques. If the computer 110 determines that an audio signal is received, then the process 600 proceeds to a block 620; otherwise the process 600 ends, or alternatively proceeds to a sleep state (as discussed above), although not shown in FIG. 6A.

In the block 620, the computer 110 receives profile(s) of individuals, e.g., from a remote computer 180 via a wireless network 170. In one example, the computer 110 retrieves the profile(s) data from the device 101 memory 120. The profile data may include data such as shown in Table 3. Alternatively, an operation of process 600 may omit receiving, updating, and/or transmitting profile(s) data. Thus, the process 600 may proceed without profiles specific to an individual or a group of individuals. Thus, a behavior pattern B may be detected based on audio data, location data, etc. without taking into account any profile data. In one example, the computer 110 may be programmed to determine the behavior pattern B based on equations (1)-(3). Thus, the computer 110 may detect the behavior pattern B based on the audio attributes, e.g., Table 1. In yet another example of detecting behavior without relying on profiles, the computer 110 may be programmed, based on example rules of Table 2, to detect the behavior pattern B based on audio attributes of, e.g., Table 1.

Next, in a block 625, the computer 110 receives audio data from one or more microphone sensors 130 included in the device 101.

Next, in a block 630, the computer 110 receives a time of day, e.g., from an internal clock, a location of the device 101, etc. In one example, the computer 110 may be programmed to determine the location of the device 101 based on data received from a WiFi router, etc.

Next, in a decision block 635, the computer 110 determines whether a verbal human interaction is detected. The computer 110 may be programmed to detect a verbal human interaction in the received audio data based on conventional voice recognition techniques. If the computer 110 detects a verbal human interaction, then the process 600 proceeds to a block 640 (see FIG. 6B); otherwise the process 600 ends, or alternatively, returns to the decision block 610, although not shown in FIG. 6A.

Now turning to FIG. 6B, in the block 640, the computer 110 determines the audio attributes of the received audio data. For example, the computer 110 may be programmed to determine word sequence(s) S, pitch P, volume, etc., of the received audio data using voice recognition techniques.

Next, in a block 645, the computer 110 identifies individual(s) in the verbal interaction detected in the audio data. In one example, the computer 110 may be programmed to identify the individual(s) based on the stored or received profile(s) data including identifier, audio attributes, etc. of individuals. In another example, the computer 110 may be programmed to identify distinct voices in the audio data without identifying specific individuals or retrieving individual profile(s). For example, the computer 110 may distinguish between two individuals in the audio data based on identifying two different set of audio attributes, e.g., pitch, volume, etc. of each individual. Thus, the computer 110 may be programmed to identify word sequence(s) S, pitch P, etc., without reference to profile(s).

Next, in a block 650, the computer 110 adds and/or updates one or more profiles. In one example, the computer 110 may be programmed to update an average likelihood $B_l$ of a behavior pattern B in the profile, as shown in example profile of Table 3.

Next, in a block 655, the computer 110 transmits the updated profiles to the remote computer 180. In one example, the computer 180 may be programmed to transmit the profile data via a local network 170, e.g., a WiFi network, to a local computer that is connected via a network, e.g., including the Internet, to the remote computer 180, and/or via a WAN network 170 such as a cellular network, etc. Alternatively, in an implementation without individual profiles, as discussed with respect to the block 620, the blocks 645, 650, 655 may be omitted. Thus, the computer 110 may be programmed to proceed with detecting a behavior pattern B without identifying individual(s).

Next, in a block 660, the computer 110 applies the trained neural network, e.g., DNN 200, to the inputs including the audio data, the audio attributes, the time, location, and/or profile(s). As discussed with respect to the block 620, the process 600 may be performed without any dependence on the profile(s). Thus, in one example, the DNN 200 may lack an input including profile(s) data. The DNN 200 may output a likelihood $B_l$ of a behavior pattern B based on the received inputs. In another example, the DNN 200 may be trained to output a likelihood $B_{l1}, B_{l2}, \ldots, B_{lm}$ of m different behavior patterns $B_1, B_2, \ldots, B_m$ based on the received inputs. In an example implementation of the process 600 without relying on profiles, the DNN 200 may be trained to detect the behavior pattern B without relying on the profiles data as an input, as discussed above with respect to FIG. 4.

Next, in a decision block 665, the computer 110 determines whether a behavior pattern B is detected. For example, the computer 110 may be programmed to determine that a behavior pattern B is detected upon determining that the determined likelihood $B_l$ of the behavior pattern B exceeds a specified threshold, e.g., 0.7. In another example, the computer 110 may be programmed to determine whether any of multiple behavior patterns $B_1, B_2, \ldots, B_m$ is detected. For example, the computer 110 may store thresholds $t_1, \ldots, t_m$, and may be programmed to determine that a behavior pattern $B_1, B_2, \ldots, B_m$ is detected, upon determining that a likelihood of $B_{l1}, B_{l2}, \ldots, B_{lm}$ of the respective behavior pattern $B_1, B_2, \ldots, B_m$ exceeds a respective threshold $t_1, \ldots, t_m$. If the computer 110 determines that the behavior pattern B is detected, then the process 600 proceeds to a block 670; otherwise the process 600 proceeds to a decision block.

In the block 670, the computer 110 reports a detection of one or more behavior patterns $B_1, B_2, \ldots, B_m$, e.g., to a remote computer 180. In one example, the computer 180 may send data including an identifier of the detected behavior pattern $B_1, B_2, \ldots, B_m$, a location of the device 101, etc. Additionally, the computer 110 may be programmed to send data including an identifier of the individual with the detected behavior pattern $B_1, B_2, \ldots, B_m$. Following the block 670, the process 600 ends, or alternatively, returns to the decision block 610, although not shown in FIGS. 6A-6B.

In the decision block 675, the computer 110 determines whether a verbal interaction is ongoing (or continuing). For example, the computer 110 may be programmed to determine that a verbal interaction is ongoing upon detecting a word in the audio data within a last 1 second of the received audio data. If the computer 110 determines that the verbal interaction is continuing, then the process 600 returns to the block 620 (see FIG. 6A); otherwise the process 600 ends.

The article "a" modifying a noun should be understood as meaning one or more unless stated otherwise, or context requires otherwise. The phrase "based on" encompasses being partly or entirely based on.

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random-access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random-access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A system, comprising:
a microphone;
a computing device including a processor and a memory, the memory storing instructions executable by the processor to:
identify a word sequence spoken by an individual in audio input received from the microphone;
determine a behavior pattern for the individual from the word sequence;
determine a tone for a plurality of words in the word sequence;
determine whether the behavior pattern is detected upon determining that the tone of the plurality of words exceeds a predetermined threshold stored in the memory;
determine an identity of the individual based upon one or more words spoken in the word sequence; and
in response to determining the behavior pattern is detected, report the behavior pattern, the one or more words in the word sequence associated with the identity of the individual, and a location of the individual to a remote server.

2. The system of claim 1, the instructions further including instructions to:
provide the audio input as input to a machine learning program; and
receive the behavior pattern as output from the machine learning program.

3. The system of claim 2, the instructions further including instructions to provide at least one of the location, an identifier of the individual, or a time of day in the input to the machine learning program.

4. The system of claim 2, the instructions further including instructions to receive an update to the machine learning program from the remote server.

5. The system of claim 1, the instructions further including instructions to determine the behavior pattern from a volume, a pitch, a tone in the word sequence, or the location at which the audio input was received.

6. The system of claim 1, the instructions further including instructions to identify the behavior pattern based on identifying the individual from the word sequence.

7. The system of claim 6, the instructions further including instructions to identify the behavior pattern based on identifying two individuals from the word sequence.

8. The system of claim 1, the instructions further including instructions to report the behavior pattern via a communication network to the remote server.

9. The system of claim 1, the instructions further including instructions to store an individual profile and identify the individual based on the audio input and the individual profile, wherein the individual profile includes at least one of an identifier, vocabulary characteristic, syntax characteristic, voice attributes, and audio data including an individual's voice.

10. The system of claim 9, the instructions further including instructions to determine the behavior pattern based at least in part on the individual profile.

US 12,573,388 B2

17

11. A method, comprising:

identifying a word sequence spoken by an individual in audio input received from a microphone;

determining a behavior pattern for the individual from the word sequence;

determining a tone for a plurality of words in the word sequence;

determining whether the behavior pattern is detected upon determining that the tone of the plurality of words exceeds a predetermined threshold;

determining an identity of the individual based upon one or more words spoken in the word sequence; and in response to determining the behavior pattern is detected, reporting the behavior pattern, the one or more words in the word sequence associated with the identity of the individual, and a location of the individual to a remote server.

12. The method of claim 11, further comprising:

providing the audio input as input to a machine learning program; and receiving the behavior pattern as output from the machine learning program.

13. The method of claim 12, further comprising providing at least one of the location, an identifier of the individual, or a time of day in the input to the machine learning program.

14. The method of claim 12, further comprising receiving an update to the machine learning program from the remote server.

15. The method of claim 11, further comprising determining the behavior pattern from a volume, a pitch, a tone in the word sequence, or the location at which the audio input was received.

16. The method of claim 11, further comprising identifying the behavior pattern based on identifying the individual from the word sequence.

17. The method of claim 16, further comprising identifying the behavior pattern based on identifying two individuals from the word sequence.

18. The method of claim 11, further comprising reporting the behavior pattern via a communication network to the remote server.

19. The method of claim 11, further comprising storing an individual profile and identify the individual based on the audio input and the individual profile, wherein the individual profile includes at least one of an identifier, vocabulary characteristic, syntax characteristic, voice attributes, and audio data including an individual's voice.

20. The method of claim 19, further comprising determining the behavior pattern based at least in part on the individual profile.

* * * * *